United States Patent [19]

Lewis

[11] Patent Number: 5,061,374
[45] Date of Patent: Oct. 29, 1991

[54] REVERSE OSMOSIS AS FINAL FILTER IN ULTRAPURE DEIONIZED WATER SYSTEM

[75] Inventor: Vic E. Lewis, Boise, Id.

[73] Assignee: Micron Technology, Inc., Boise, Id.

[21] Appl. No.: 451,640

[22] Filed: Dec. 18, 1989

[51] Int. Cl.⁵ .............................................. C02F 9/00
[52] U.S. Cl. .................................... 210/638; 210/654;
210/662; 210/663; 210/668; 210/669; 210/686;
210/96.2; 210/259; 210/266; 210/321.89;
210/900
[58] Field of Search .............. 210/638, 662, 663, 668,
210/669, 686, 96.2, 257.2, 259, 266, 290,
321.87–321.89, 500.38, 900, 652, 654

[56] References Cited

U.S. PATENT DOCUMENTS 3,870,033 3/1975 Faylor et al. ........................ 210/900
3,985,648 10/1976 Casolo ................................ 210/686

Primary Examiner—Ivars Cintins
Attorney, Agent, or Firm—Stanley N. Protigal; Angus C. Fox, III

[57] ABSTRACT

An improved deionized water treatment system and method that consists of using a first and second water treatment train wherein the second train improves water quality by reducing particulate and total organic carbon by means of a reverse osmosis membrane assembly. The final pure water having particulate sizes less than one micron and a total organic carbon measure of less than one part per billion.

10 Claims, 4 Drawing Sheets

REVERSE OSMOSIS AS FINAL FILTER IN ULTRAPURE DEIONIZED WATER SYSTEM

BACKGROUND OF THE INVENTION

This invention relates to the use of a reverse osmosis system as a preliminary and as a final processing method to obtain ultrapure deionized (DI) water for use in environments where such water is essential, as in the manufacture of integrated circuit (IC) chips.

The process of manufacturing IC chips consists of multiple repetitions of the steps of coating, etching and cleaning semiconductor chips or dies. One of the critical steps in this sequence is the cleaning process following chemical etching. The cleaning process includes loading the wafers into a wafer carrier, placing the wafer carrier in a spin rinser/dryer, and while spinning, rinsing the wafers in deionized water and drying the wafers by passing an inert heated gas over the wafers. The cleanliness of the water is of paramount importance to producing acceptable products. The cleanliness can be monitored during the rinse cycle by a resistivity measuring means that prevents the rinser/dryer from going into a dry cycle until the used rinse water reaches a predetermined resistivity, indicating a proper water cleanliness after rinsing. As much as 2,000 gallons of water may be used to process one loaded wafer carrier, since the process may require 9-12 rinses. The wafer manufacturing and cleaning processes are generally carried out in clean rooms which often exceed the cleanliness requirements of a hospital operating room insuring that wafers do not become contaminated by particulate matter. Consequently, great emphasis is placed on using and reclaiming ultrapure DI water for the washing process. The DI water currently used in the industry for this process often approaches 18 megohms resistivity (the longitudinal electrical resistance of a uniform rod of unit length and unit cross-sectional area), or specific resistance. A typical washing process in the IC manufacturing industry is terminated when the rinse water resistivity approaches 18 megohms (normal household tap water is about 0.003 megohms).

Resistivity is one measure of the quality of DI water. Total organic carbon (TOC) and particulate counts are additional measures indicating water cleanliness or quality. Membrane filters have been developed to reduce the particulate in the water to a level of less than 30 counts per milliliter sizes 0.1 micron to 1 micron, and control of TOC is a major concern in ultrapure water production. Equipment for the reduction or the removal of TOC is a major part of current ultrapure water systems. Currently available TOC removal systems use 185 nanometer ultraviolet (UV) light, or add ozone to the water to reduce TOC levels. Ozone is effective in removing TOC but presents new problems in a recirculating system, since the ozone must be removed from the water before passing through the DI beds to avoid costly damage to the resin.

Finally, reverse osmosis (RO) is a method of manufacturing ultrapure water which has been incorporated into a number of industrial processes. U.S. Pat. No. 4,342,651, issued Aug. 3, 1982, discloses a process to make "sterilized and bacteria-free water suitable for medical injections and other [technical] purposes". The system consists of a DI water source that is passed through a pair of reverse osmosis filters to the final product use. Before use the water may be recycled to improve the cleanliness of the water.

U.S. Pat. No. 4,156,621, issued May 29, 1979, discloses a dishwasher water recovery system using reverse osmosis membranes as the final polishing unit prior to storing and re-using the water. The process uses water pressures of 100-450 psi and temperatures of 70°-80° F., resulting in removal of the 90-95% of "ionized dissolved mineral salts" and removal of 99% of the "non-ionized organic compounds".

Additionally, disclosures contained in the *American Institute of Chemical Engineers* and the *EPA Technology Transfer Proceedings of* 1975 relating to reverse osmosis for purifying liquid streams, includes an article entitled "Renovation of a Hospital-Type Wastewater for Recycle", and discloses data relating to removal of TOC and conductivity conditioning RO. The resistivity of the RO water produced therein is 1/148 micromhos, or 0.0067 megohms. The article discloses a 74% average TOC reduction rate.

SUMMARY OF THE INVENTION

The IC computer chip industry currently uses a water reclamation (first train) system that typically consists of filters, pH control chemicals, cation-anion twin column ion exchangers, mixed-bed ion exchangers and millipore post filters. It is the purpose of this invention to improve the present system by use of a second train system comprising a second mixed-bed ion exchanger, an ultraviolet radiation sterilizer, a second final polishing RO filter, a final filter and appropriate instrumentation to monitor pressures, flows, pH, levels, resistivity, number and size of suspended particulates, and TOC.

It is an object of this two-train system to produce water having a resistivity of approximately 18 megohms, TOC of less than 10 parts per billion (PPB), particle counts of less than 10 particles/milliliter which are equal to 0.1 microns in diameter and zero particles greater than 0.3 microns in diameter. The single-train system of the prior art is capable of reducing the particle count to 27-50 particles/liter having a particle size of 0.3 microns.

DETAILED DESCRIPTION OF THE INVENTION

Figure 1:
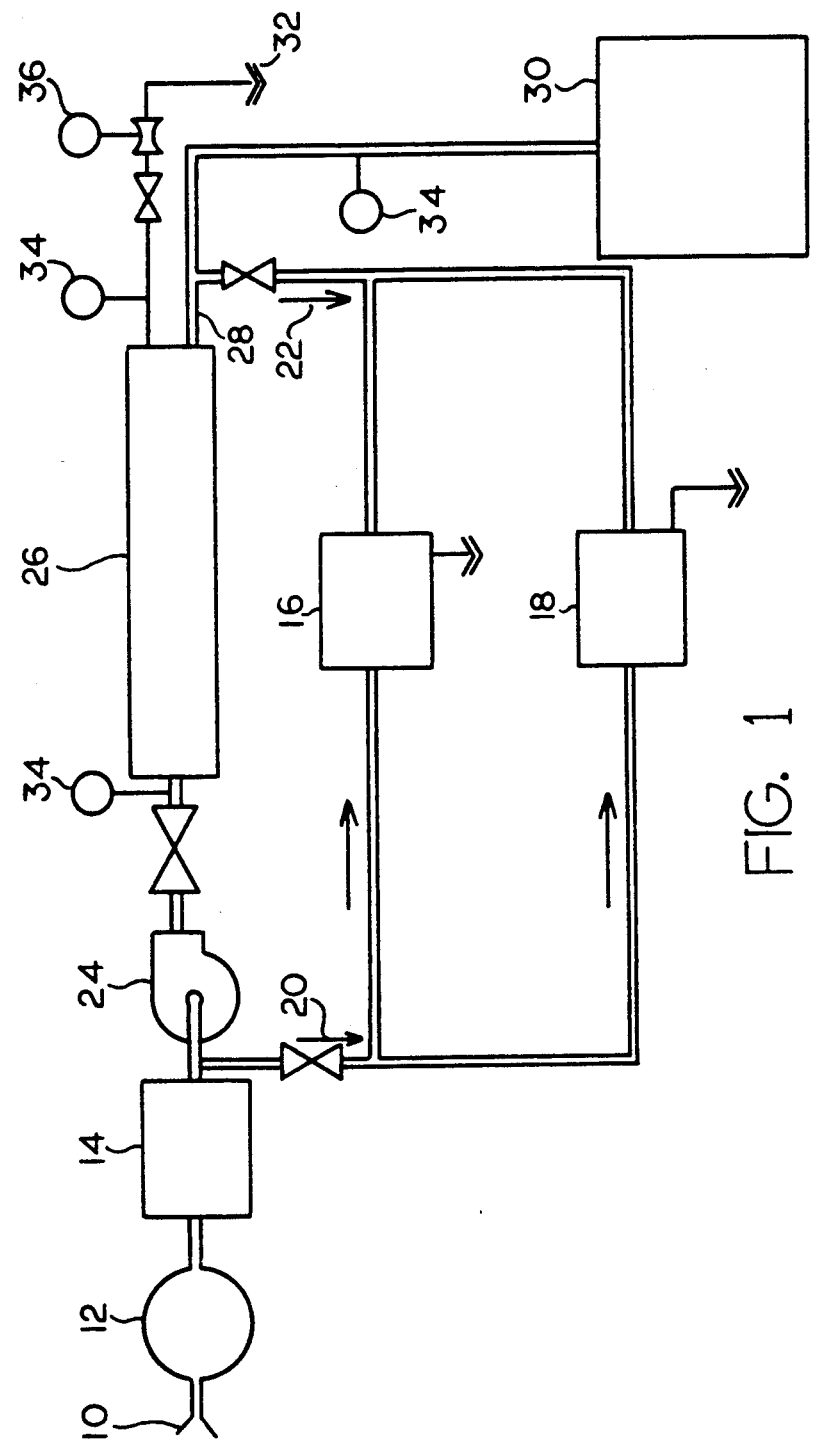
FIG. 1 is a schematic flow diagram of a reverse osmosis system test loop.

In order to demonstrate the feasibility of a reverse osmosis (RO) water polishing system to reduce both total organic carbon (TOC) and particulates, an RO test loop was established to collect data on various membranes in such a system. Referring to FIG. 1, 18 megohm resistivity water (deionized water) from a conventional water treatment or purification system was fed in at inlet 10. The water was subjected to a pretreatment through a 5-micron filter 12 and a UV sterilizer 14. An Anatel TOC analyzer 16 and a particle counter 18 monitored both feed water 20 and product water 22. Water pump 24 fed water through a fiberglass tube 26 containing various RO membranes in a spiral coiled assembly. The permeate (purified water product) exited at 28 and was stored and measured at storage tank 30. Unpurified water exited at drain 32. Pressure gauges 34 monitored inlet and discharge pressures into the RO filter, and flowmeter 36 monitored higher conductivity reject water flow.

Water samples passed through TOC analyzer 16 and particulate counter 18 for one hour periods at a controlled flow rate of two gallons/minute.

Each RO membrane assembly sample was flushed with feed water and tested until readings for particulate count, resistivity and TOC showed no improvement. Eight different RO membranes were tested, with one performing superior to the others. A loose wrap RO membrane currently in use in the food and pharmaceutical industry, manufactured by Filmtec Corporation under the product name Filmtec #SW 30-4040LW rejected 98% of the particulates, 78% of the TOC and raised the resistivity by 3%.

A preferred RO filter designated as SG-HR8040 has been incorporated into the process of the present invention. The present invention comprises a first and second water treatment train. The first water treatment train, as illustrated in FIG. 2, is a conventional water purification system which provides high quality DI water to one or more second water treatment trains (FIG. 3).

Figure 2:
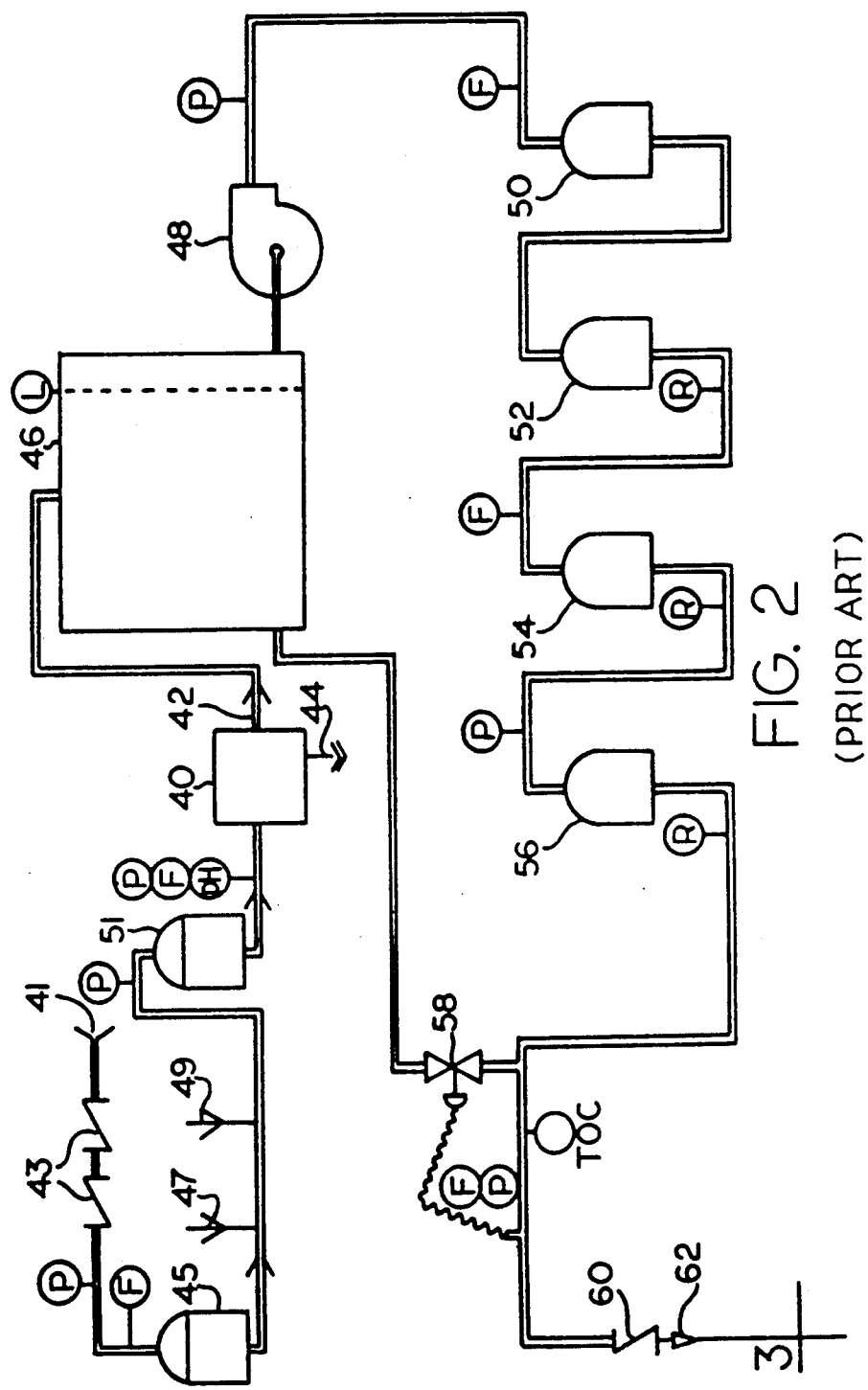
FIG. 2 is a schematic flow diagram of a water reclamation system of the prior art.

FIG. 2 illustrates the use of a reverse osmosis unit 40 incorporated into a DI water treatment train representative of systems currently used in the computer chip industry. Tap water enters the system at 41, continues through check valves 43 and enters multimedia filters 45. These filters consist of multi-layers of different grain size gravels and sands. The pH is controlled at 47 and 49 by adding either basic or acid i.e. materials, such as (NaPO$_3$)$_6$ or H$_2$SO$_4$. From prefilters 51, that are used to collect anything that passes through the multimedia filters 45, the water enters conventional RO membrane assembly 40. Purified water exits the RO membrane assembly 40 at 42, and reject water (having a higher conductivity) exits at 44. The permeate water 42 enters storage tank 46 and is pumped by means of pump 48 into twin-bed ion exchangers in the form of cation exchanger 50 and anion exchanger 52. Water leaving the twin-bed ion exchangers continues into a mixed-bed ion exchanger 54 and finally into post filter 56 which acts as a resin bed particle trap in the event of mixed bed resin retaining screen failure. The filtered water can be returned to storage tank 46 by passing through pressure regulating valve 58 or may be directed through check valve 60 into the ultrapure DI water purification system at 62.

Water produced by the first train of FIG. 2 has a TOC level of 20 to 200 PPB, particulates in the range of 50 to 23,000 counts per liter at 0.3 micron size, a resistivity of 15 to 18 megohms and a silica level of 0 to 10 parts per million (PPM).

Figure 3:
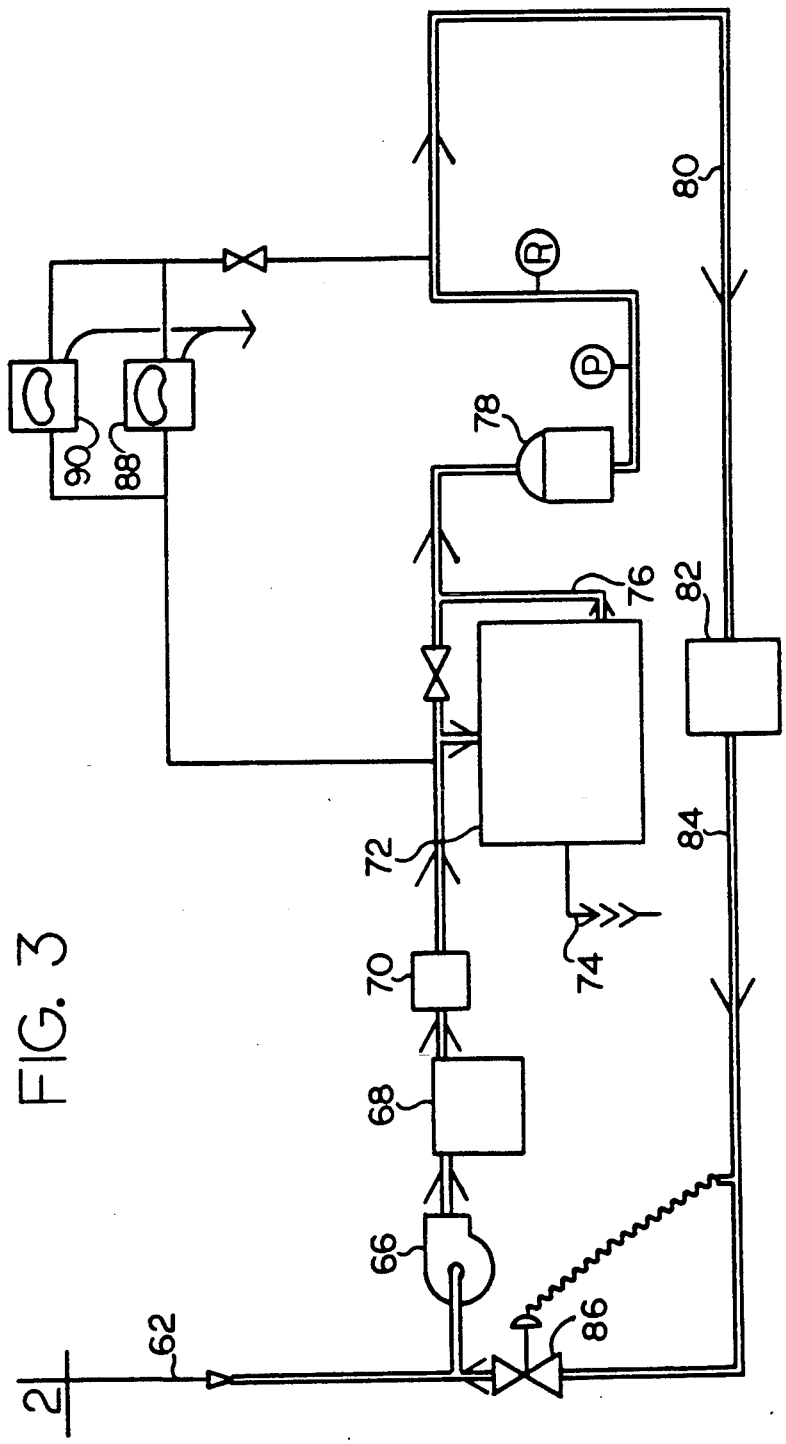
FIG. 3 is a schematic flow diagram illustrating the process of the present invention.

Referring to FIG. 3, filtered water is pumped to the inventive processing system of the present invention by means of pump 66. Pump 66 directs the water into a mixed-bed ion exchanger 68 having both cation and anion resins mixed together and then through an ultraviolet sterilizer 70, a bacteria killing process using 254 nanometer light, before entering RO membrane assembly 72. Reject water of higher conductivity is discharged at 74 due to pressure from pump 66. Purified water exits at 76 and continues into a 0.10 micron filter 78, which is installed as a precautionary measure in the event of RO membrane assembly failure upstream of the filter. The water is directed through conduit 80 to a use area, in this case to a wafer (the pure water rinse and dry machines 82 where IC wafers are rinsed prior to drying). Water discharged from this rinse and dry machine 82 into conduit 84 passes through pressure regulating valve 86 to pump 66 where it is recycled. If the water is contaminated sufficiently, it may be necessary to direct the discharge water 84 to the first train at 41 (FIG. 2).

The particle count measuring device 88 measures particle sizes from 0.1 micron to 1.0 micron at flows of 300 milliliters per minute and samples either at the feed water to the RO assembly or the product permeate water from the RO assembly. TOC analyzer 90 can measure TOC to less than one PPB at the same locations.

Figure 4:
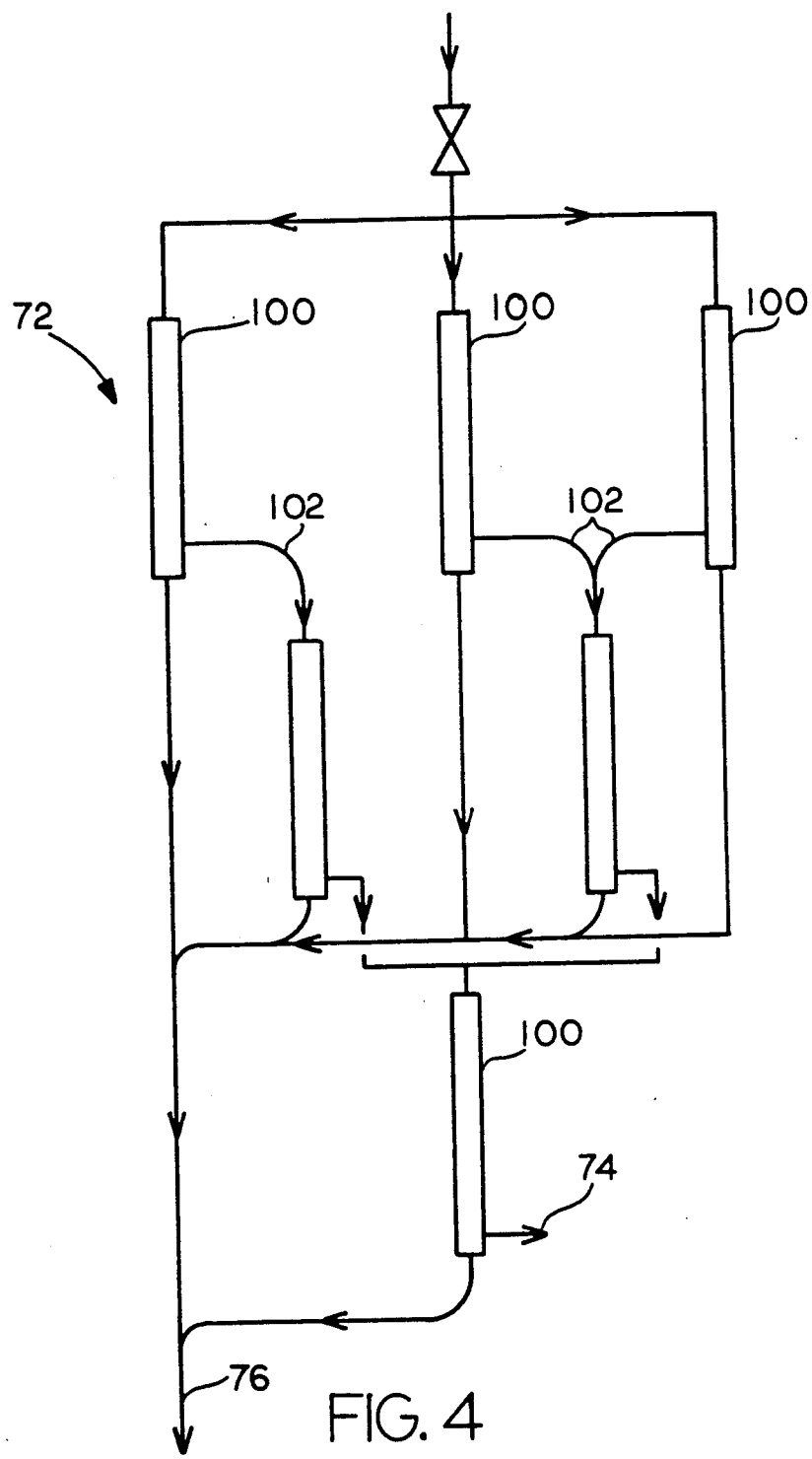
FIG. 4 is a schematic flow diagram illustrating the RO assembly piping configuration.

FIG. 4 illustrates the RO assembly 72 piping configuration, identified as a 3-2-1 array system where the reject water from three RO modules 100 is discharged at 102 to two RO modules 100, who in turn feed reject water to one RO module 100. This configuration gives a high recovery factor. For instance a rejection rate of 45% for each module when installed in a 3-2-1 array will have 90% recovery at 76 and 10% rejection water at 74.

Following installation of membranes in RO assembly 72, the membranes are flushed with hydrogen peroxide and rinsed to improve TOC rejection. The system takes approximately 200 hours to stabilize after which a TOC rejection rate of about 80% is reached. After about 290 hours of operation rejection rates of particulates having diameter of 0.3 micron ranges from about 75 to 80%, and after an additional 244 hours, the rejection rate of such particulate levels off at about 96.5%. TOC is measured on an Anatel TOC analyzer and particulate rejection is measured by Dantiole Measuring Systems PMS-HSLIS system. The Anatel TOC analyzer indicates sensitivities to less than one PPB and the particle counter system indicates particle counts as low as 0 counts/milliliter in the range of 0.1 to 1 micron particle size.

The preferred RO membrane of the present invention is a thin film polyamide coiled up with a cheesecloth-type material and a polypropylene retainer. The preferred membrane material is identified as SG-HR8040 manufactured by FilmTec.

Water quality results using the process of the present invention are set forth below.

| | |
|---|---|
| Input - 27-50 particles/liter greater than 0.3 micron | |
| Resistivity | 17.5 to 18.3 megohms |
| Resistivity Improvement | 100 to 103% |
| TOC | 0 to 10 PPB |
| TOC Rejection | 75 to 80% |
| Particle Rejection | 90 to 97% |
| Output - less than 10 particles/milliliter equal to than 0.1 micron and zero particles greater than 0.3 micron | |

These values are achieved at a flow rate of about 470 gallons per minute and a RO membrane assembly differential pressure of about 430 psi. The differential pressure of 430 psi is needed to obtain flow rates of 470 gpm, the water flow rates used by the pure water washing system.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. An ultrapure deionized water treatment system comprising:
   a. a first water treatment train, including means for reducing impurities in water, receiving water from a water source and producing water having about 20 to 200 PPB and about 50 to 23,000 particle counts per liter at 0.3 micron, resistivity of 15 to 18 megohms and silica levels of 0 to 10 ppm;
   b. a second water treatment train, including means for reducing impurities in water, receiving water produced by said first water treatment train and producing water having about less than 10 PPB and less than 1,000 counts per liter at 0.1 micron particle size, comprising:
      i. a mixed bed ion exchanger;
      ii. a UV sterilizer;
      iii. a reverse osmosis (RO) membrane apparatus, and
      iv. a subsequent filter, downstream of the second water treatment train, capable of filtering particulates having a diameter of 0.1 micron.

2. The system as recited in claim 1, wherein an RO membrane in said RO membrane apparatus of said first and second means of water treatment comprises:
   a. a thin film polyamide;
   b. a porous cloth material; and
   c. a polypropylene retaining material.

3. The system as recited in claim 1, comprising instrumentation to measure contamination by particulates having a diameter of between about 0.1 and 1.0 microns, and a total organic carbon (TOC) measuring apparatus to measure TOC above one PPB.

4. A method of providing ultrapure deionized water having low total organic carbon, (TOC) low particulate contamination and high resistivity, comprising:
   a. purifying the water in a first purification train to a level of one PPB TOC and less than 1,000 particulates having a diameter of at least 0.1 micron;
   b. deionizing the water from the first train in a mixed-bed ion exchanger;
   c. sterilizing the water of step b. in an ultraviolet sterilizer;
   d. removing total organic carbon and particulate contamination from the water of step c. by means of a reverse osmosis membrane assembly;
   e. filtering the water of step d. with a final 0.1 micron filter; and
   f. monitoring the quality of the water of step e. using particle counting means and total organic carbon measuring means.

5. The method as recited in claim 4, wherein the reverse osmosis membrane assembly is an array of 8-inch tubes arranged in a 3-2-1 configuration.

6. The method as recited in claim 4, wherein the membrane assembly materials comprise a thin film polyamide, a porous cloth material and a polypropylene retaining material.

7. The method as recited in claim 4, wherein the particle counting means will count as low as 0 particles per liter of 0.1 to 1.0 micron particle size and the total organic carbon measuring means will measure less than one PPB of total organic carbon.

8. An ultrapure deionized water treatment system comprising:
   a. a first water treatment train, including means for reducing impurities in water, receiving water from a water source and producing water having about 20 to 200 PPB and about 50 to 23,000 particle counts per liter at 0.3 micron, resistivity of 15 to 18 megohms and silica levels of 0 to 10 ppm;
   b. a second water treatment train, including means for reducing impurities in water, receiving water produced by said first water treatment train and producing water having about less than 10 PPB and less than 1,000 counts per liter at 0.1 micron particle size, comprising:
      i. a mixed bed ion exchanger;
      ii. a UV sterilizer;
      iii. a reverse osmosis (RO) membrane apparatus, and
      iv. a subsequent filter, downstream of the second water treatment train, capable of filtering particulates having a diameter of 0.1 micron,
   wherein the RO membrane apparatus comprises an array of 8-inch tubes arranged in a 3-2-1 configuration.

9. The system as recited in claim 8, wherein an RO membrane in said RO membrane apparatus comprises:
   a. a thin film polyamide;
   b. a porous cloth material; and
   c. a polypropylene retaining material.

10. The system as recited in claim 8, comprising instrumentation to measure contamination by particulates having a diameter of between about 0.1 and 1.0 microns, and a total organic carbon (TOC) measuring apparatus to measure TOC above one PPB.

* * * * *

UNITED STATES PATENT AND TRADEMARK OFFICE
CERTIFICATE OF CORRECTION

PATENT NO. : 5,061,374
DATED : October 29, 1991
INVENTOR(S) : Vic E. Lewis

It is certified that error appears in the above-indentified patent and that said Letters Patent is hereby corrected as shown below:

Column 2, line 18, delete "micromhos" and insert -- microhms --.

Signed and Sealed this

Eighteenth Day of January, 1994

Attest:

BRUCE LEHMAN

Attesting Officer     Commissioner of Patents and Trademarks